United States Patent
Raitanen et al.

[11] Patent Number: 6,044,794
[45] Date of Patent: Apr. 4, 2000

[54] CONTOURED AND SUSPENDED PET BED

[76] Inventors: Lucy A. Raitanen, N85 W15135 Mac Arthur Dr., Menomonee Falls, Wis. 53051; Gregory J. Clower, 3906 Coats Rd., Zepherhills, Fla. 33541

[21] Appl. No.: 09/078,927

[22] Filed: May 14, 1998

[51] Int. Cl.[7] .......................... A01K 1/035; E04H 15/36; E04H 15/40
[52] U.S. Cl. ...................... 119/28.5; D30/118; D21/834; 5/89.1; 5/123; 135/119; 135/121
[58] Field of Search .................... 119/28.5, 482, 119/169, 171; D30/118; D21/834; 5/89.1, 98.3, 627, 121, 123, 200.1; 135/90, 121, 119

[56] References Cited

U.S. PATENT DOCUMENTS

| | | |
|---|---|---|
| D. 151,291 | 10/1948 | Shoemaker et al. .................... D30/118 |
| D. 239,633 | 4/1976 | Henry ..................................... D30/118 |
| D. 289,699 | 5/1987 | Runion ................................... D30/118 |
| D. 294,752 | 3/1988 | Palier ..................................... D30/118 |
| D. 376,447 | 12/1996 | Stump .................................... D30/118 |
| 1,587,706 | 6/1926 | Dozier . |
| 1,879,473 | 9/1932 | Pitts . |
| 1,887,108 | 11/1932 | Steese . |
| 2,854,948 | 10/1958 | Drayson . |
| 3,125,663 | 3/1964 | Hoffman .................................. 219/46 |
| 3,565,040 | 2/1971 | Pohl . |
| 4,063,318 | 12/1977 | Nicholson . |
| 4,597,359 | 7/1986 | Moorman ............................... 119/28.5 |
| 4,646,770 | 3/1987 | Lobato . |
| 4,729,343 | 3/1988 | Evans ..................................... 119/28.5 |
| 5,072,694 | 12/1991 | Haynes et al. . |
| 5,097,545 | 3/1992 | Hooi . |
| 5,749,314 | 5/1998 | Pelham et al. ......................... 119/28.5 |

*Primary Examiner*—Peter M. Poon
*Assistant Examiner*—Yvonne R Abbott
*Attorney, Agent, or Firm*—Donald J. Ersler

[57] ABSTRACT

A contoured and suspended pet bed includes a frame and a cover. The frame has a cover ring which has an oval shape and a frame which can have cantilever, or S-shaped suspension. The cover is slipped over the top of the frame and has two flaps which are retained in place with VELCRO strips. The cover is structured such that there is extra material which will form a depression where the pet lays. This extra material not only supports the bottom of the pet but will contact the sides of the pet, similar to a hammock. If the cover is fabricated from a super stretchable synthetic material such as spandex, there would be no need to form a depression in the material.

7 Claims, 6 Drawing Sheets

6,044,794

CONTOURED AND SUSPENDED PET BED

BACKGROUND OF THE INVENTION

1. Field of the Invention

The present invention relates generally to pet beds and more specifically to a contoured and suspended pet bed which is structured to conform to the body of a pet.

2. Discussion of the Prior Art

There are several designs of pet beds on the market. The drawback to most of these designs are their inability to fully conform to the body of a pet. Further, many pet beds lack a good suspension system which deprives the pet of the ability to bounce and play on the bed if they should so desire.

Accordingly, there is a clearly felt need in the art for a contoured and suspended pet bed which conforms to the body of the pet while providing the pet with the ability to bounce and play in a confined area.

SUMMARY OF THE INVENTION

The primary objective of the present invention is to provide a contoured and suspended pet bed which conforms to the body of the pet while providing the pet with the ability to bounce and play in a confined area.

According to the present invention, a contoured and suspended pet bed includes a frame and a cover. The frame has a cover ring which has an oval shape and a suspension which can be cantilever, or an S-shape. The S-shaped frame provides suspension on both ends of the pet bed, as opposed to just one end with the cantilever suspension.

The cover is slipped over the cover ring of the frame. The cover has two VELCRO fastenable flaps which are used to secure the cover on the cover ring. VELCRO is a registered trademark of Velcro Industries B.V. of Switzerland. The cover is structured such that there is extra material which will form a pocket in the middle thereof where the pet lays. This extra material not only supports the bottom of the pet but will contact the sides of the pet, similar to a hammock. It is also possible to make the cover of a super stretchable synthetic material such as spandex. This material would not require extra material to form a pocket when a pet is placed therein. It is preferably that the cover be fabricated from a washable fabric to ensure sanitary conditions.

Accordingly, it is an object of the present invention to provide a pet bed which is constructed to comfortably conform to the shape of a pet.

It is a further object of the present invention to provide a pet bed which is suspended to allow a pet to bounce and play on thereof.

It is yet a further object of the present invention to provide a pet bed with a frame that is one piece which requires no assembly.

Finally, it is another object of the present invention to provide a pet bed which has no sharp corners or edges which may injure a pet.

These and additional objects, advantages, features and benefits of the present invention will become apparent from the following specification.

DETAILED DESCRIPTION OF THE PREFERRED EMBODIMENTS

Figure 1:
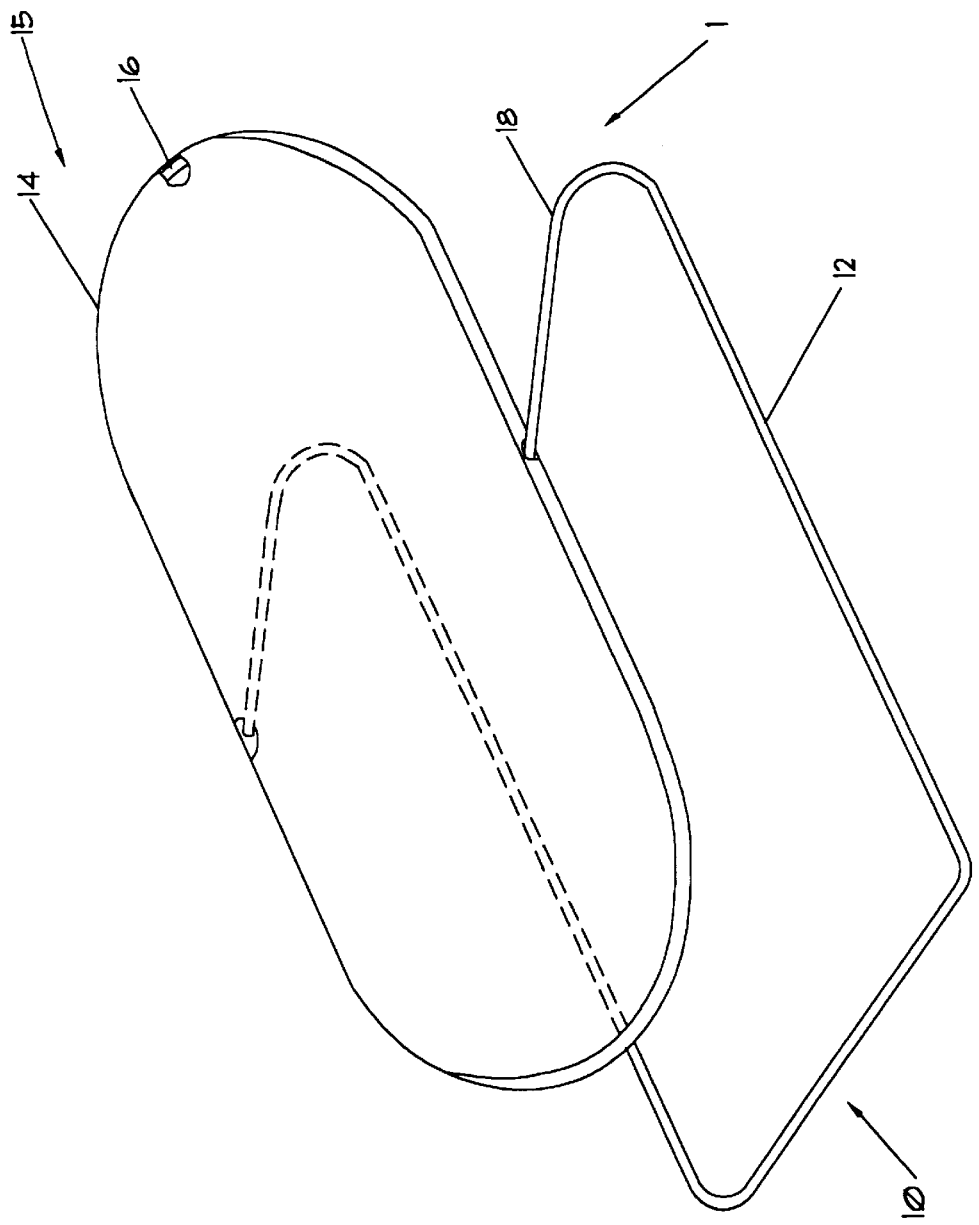
FIG. 1 is a perspective view of contoured and suspended pet bed with a cantilever suspension in accordance with the present invention.
Figure 1A:
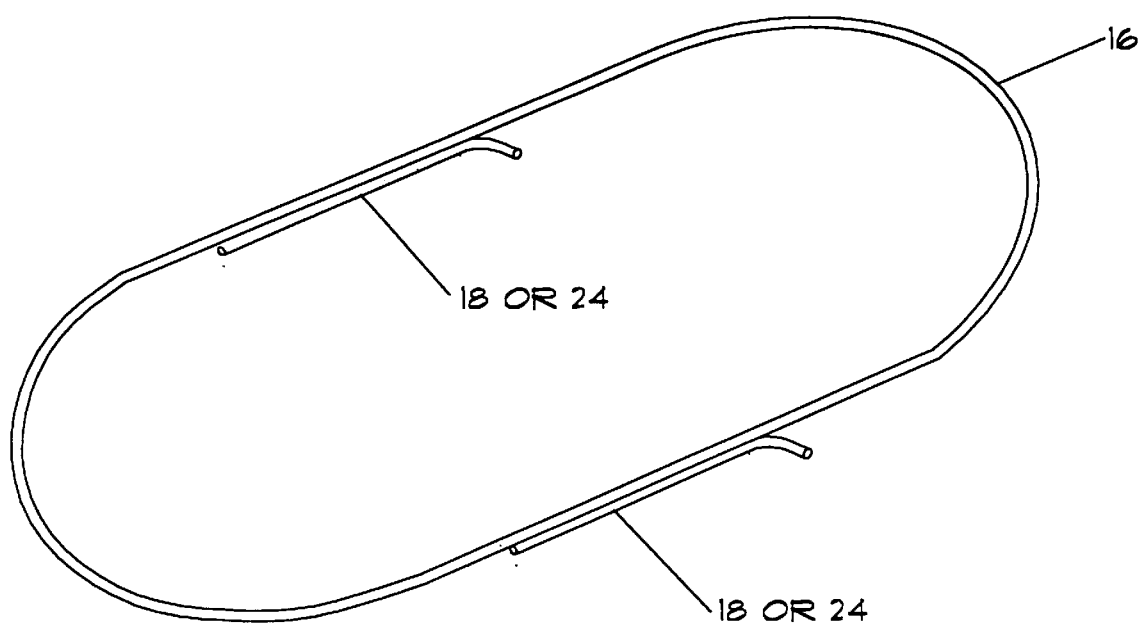
FIG. 1a is a perspective view of a cover ring for a cantilever frame or S-frame pet bed in accordance with the present invention.

With reference now to the drawings, and particularly to FIG. 1, there is shown a perspective view of a contoured and suspended pet bed with a cantilever suspension 1. The contoured and suspended pet bed 1 includes a cantilever frame 10 and a cover 14. With reference to FIGS. 1a and 31 the cantilever frame 10 includes a cover ring 16, a pair of legs 18, and a base 12. The cover 14 is slid over the cover ring 16. The cover ring 16 is preferably an oval shape to match the shape of most pets. The first end of the legs 18 are preferably welded to the cover ring 16 to form the one piece cantilever frame 10. The second end of the legs 18 are formed into a flat portion which act as a base 12 of the cantilever frame 10. The legs 18 are bent in such a fashion at substantially the middle thereof that they form a cantilever suspension.

Figure 2:
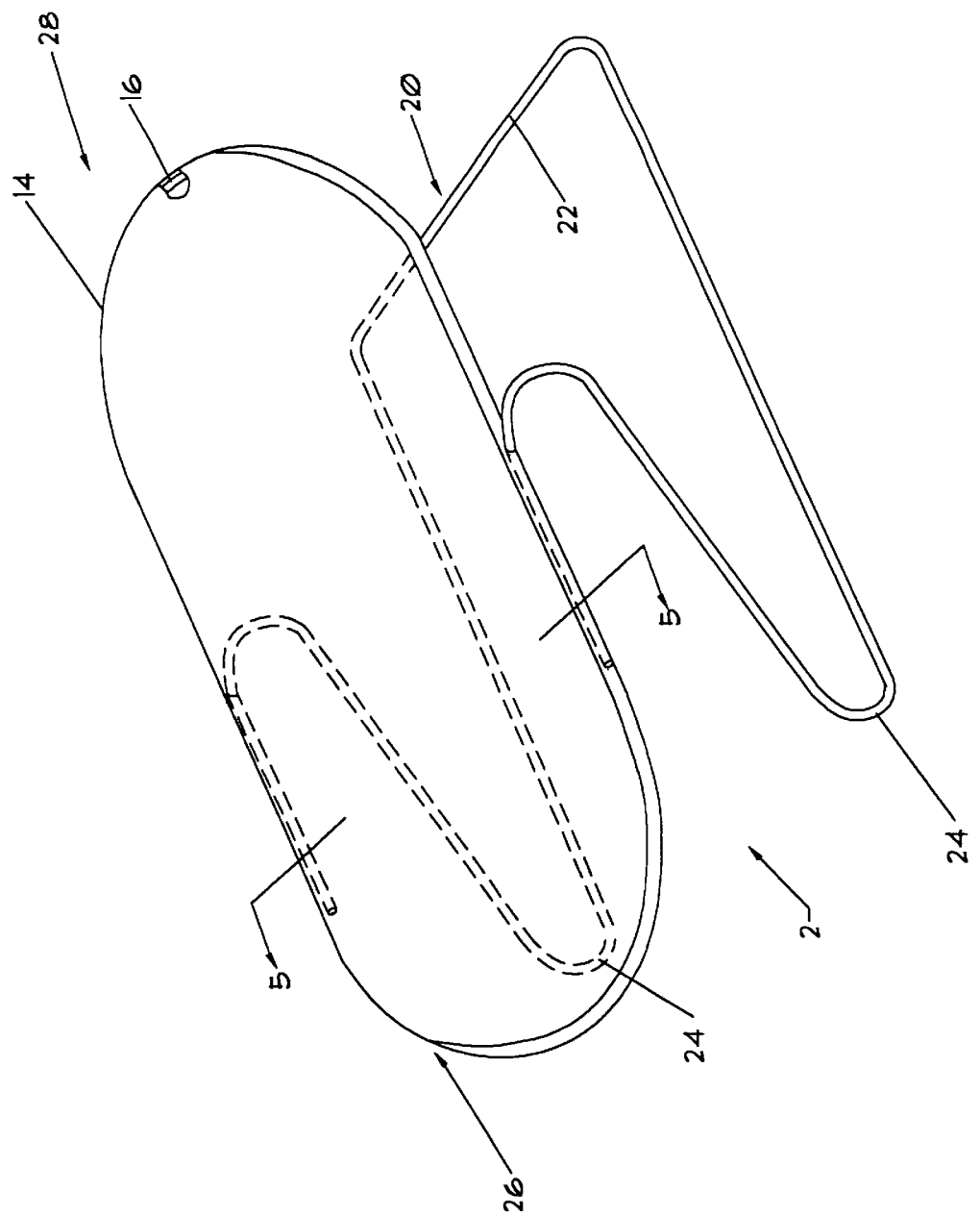
FIG. 2 is a perspective view of contoured and suspended pet bed with an S-shaped suspension in accordance with the present invention.
Figure 3:
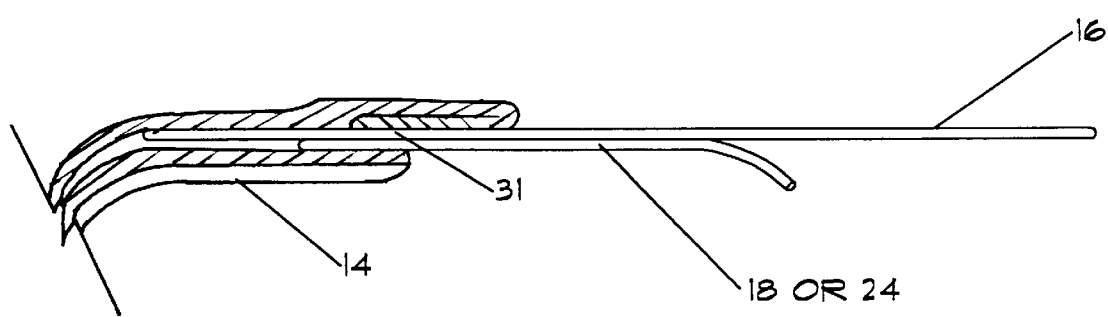
FIG. 3 is a side view of a cover ring of the frame with a cross sectional view of the cover which is partially attached to the cover ring in accordance with the present invention.

FIG. 2 shows the contoured and suspended pet bed 2 which includes an S-frame 20 and a cover 14. With reference to FIGS. 1a and 3, the S-frame 20 includes a cover ring 16, a pair of legs 24, and a base 22. The cover 14 is slid over the cover ring 16. The cover ring 16 preferably has an oval shape to match the shape of most pets. The first end of the legs 24 are preferably welded to the cover ring 16 to form the one piece S-frame 20. The second end of the legs 24 are formed into a flat portion which act as a base 22 of the S-frame 20. The S-frame construction allows vertical motion at the first end 26 as well as the second end 28. The contoured and suspended pet bed 1 only allows motion at a second end 15. FIG. 3 shows a cover ring 16 with a cover 14 partially slid over thereof. The legs 24 are bent at substantially the middle thereof in such a fashion that they form an S-suspension.

The following dimensions and materials are given by way of example and not by way of limitation. It is preferable that the cantilever frame 10 and the S-frame 20 are fabricated from spring steel wire with a diameter of 5/16 inches. Other diameter of wires may be used, also other cross sectional shapes of wire may be used such as square or hexagon. Other materials such as cold rolled, hot rolled or stainless steel may also be used for the material.

Figure 4:
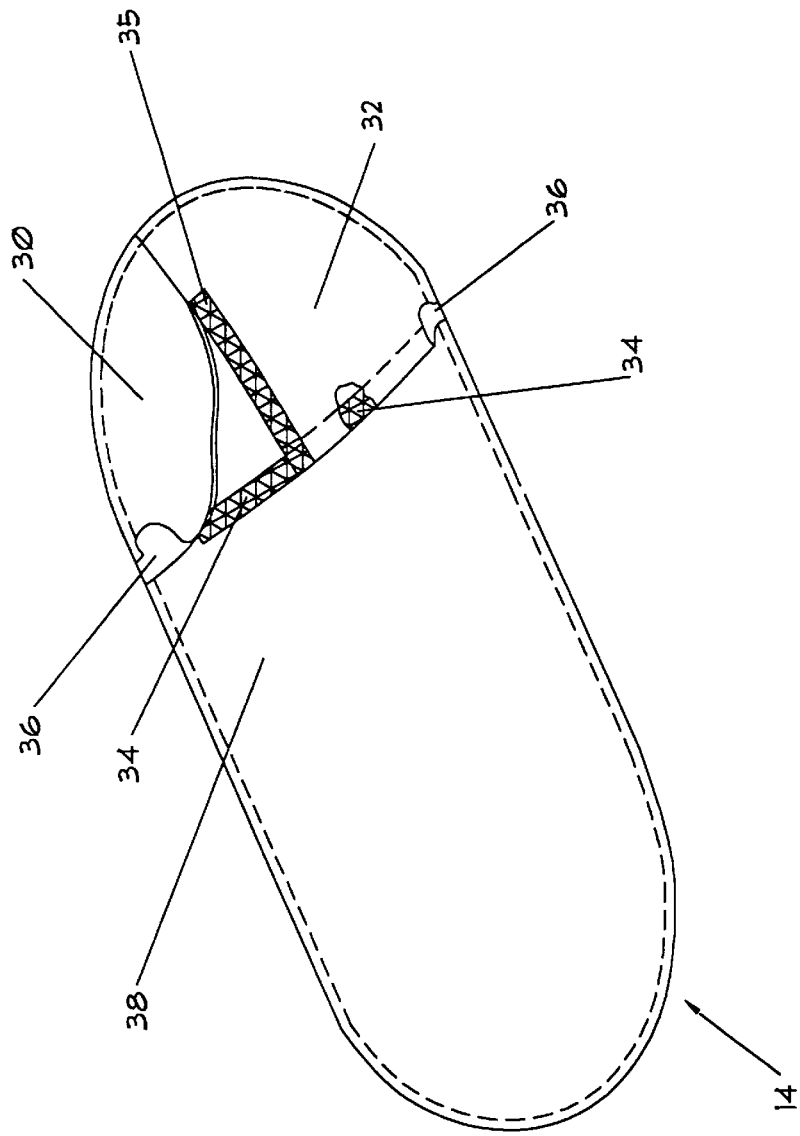
FIG. 4 is a bottom view of the cover with two flaps in accordance with the present invention.
Figure 5:
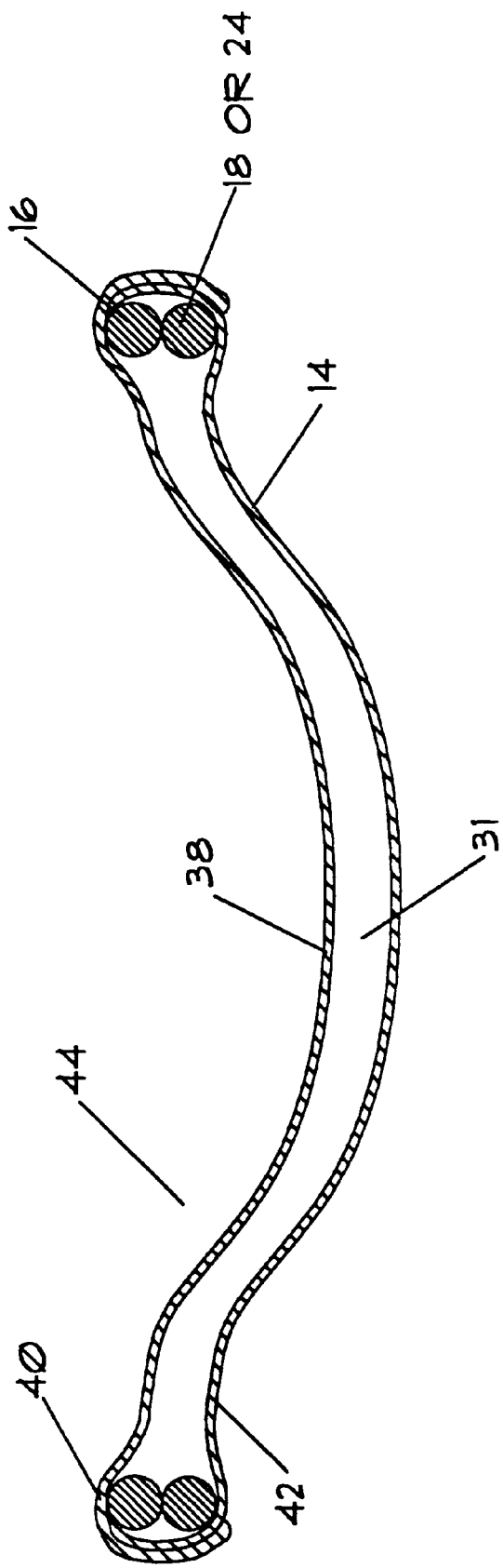
FIG. 5 is a cross-sectional view of the top of the frame with the cover attached thereto in accordance with the present invention.

FIG. 4 shows a bottom view of the cover 14. The cover 14 preferably includes a first flap 30 and a second flap 32. When sliding the cover 14 on to the cover ring 16, the first flap 30 and the second flap 32 are pushed inside a pocket 31 of a pocket end 38 of the cover 14. With reference to FIG. 5, the pocket end 38 has a first piece of material 40 which is fastened to a second piece of material 42 such that a pocket 31 is formed therebetween for insertion of the cover ring 16. The second flap 32 is preferably fastened to the pocket end 38 with a VELCRO strip 34. The first flap 30 is also preferably fastened to the pocket end 38 and the second flap 32 with the VELCRO strip 34, and a velcro strip 35, respectively. The VELCRO strips could be replaced with snaps or any quick fastening device. A leg clearance hole 36 is formed between the pocket end 38 and either flap. The leg clearance hole 36 provides clearance for legs 18 or legs 24. The pocket end 38 provides improved strength to the cover 14 compared to other designs of pet beds which merely rely on velcro strips to hold a cover in place. It is preferable that the cover 14 be fabricated from a soft, washable fabric such as cotton or any synthetic blend.

FIG. 5 shows a cross sectional view of the pocket end 38 of a cover 14 mounted on the cover ring 16. The cover 14 is preferably structured to have extra material which forms a depression 44 in the middle center of thereof. The depression 44 not only supports the bottom of the pet but will also contact the sides of the pet, similar to a hammock. Cats in particular like having their bodies cuddled in this fashion. It is also possible to make the cover-of a stretchable synthetic material such as spandex; this material would not require an excess length to form a depression 44 when a pet is placed therein. It is also preferably that cover be washable to ensure sanitary conditions.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A pet bed comprising:
   a frame having a cover ring and a base said cover ring being supported by said base; and
   a cover which fits on said cover ring, said cover having a depression formed in the middle thereof to accommodate a pet, said cover having a pocket end, a first flap, and a second flap, said first and second flaps being moveable to allow the insertion of said cover ring into said pocket end of said cover, said first and second flaps being easily fastenable and unfastenable to said pocket end to retain said cover on said, cover ring.

2. The pet bed of claim 1, further comprising:
   at least two legs being welded to said cover ring at a first end, said at least two legs being bent to form a cantilever suspension at substantially the middle thereof, said at least two legs being bent at a second end to form said base.

3. The pet bed of claim 1, further comprising:
   at least two legs being welded to said cover ring at a first end, said at least two legs being bent to form an S-suspension at substantially the middle thereof, said at least two legs being bent at a second end to form said base.

4. A pet bed comprising:
   a frame having a cover ring and at least two legs being attached to said cover ring at a first end, said at least two legs being bent to form an S-suspension at substantially the middle thereof, said at least two legs being bent at a second end to form a base; and
   a cover which fits on said cover ring, said cover having a pocket end, a first flap, and a second flap, said first and second flaps being moveable to allow the insertion of said cover ring into said pocket end of said cover, said first and second flaps being easily fastenable and unfastenable to said pocket end to retain said cover on said cover ring.

5. The pet bed of claim 4, further comprising:
   said cover being fabricated from extra material such that a depression is formed in the center thereof to accommodate a pet.

6. The pet bed of claim 4, further comprising:
   said cover being fabricated from a super stretchable synthetic material.

7. A pet bed comprising:
   a frame having a cover ring and at least two legs which are fastened to said cover ring at a first end, said at least two legs being bent to form a cantilever suspension at substantially the middle thereof, said at least two legs being bent at a second end to form said base; and
   a cover which fits on said cover ring, said cover having a depression formed in the center thereof to accommodate a pet, said cover having a pocket end, a first flap, and a second flap, said first and second flaps being moveable to allow the insertion of said cover ring into said pocket end of said cover, said first and second flaps being easily fastenable and unfastenable to said pocket end to retain said cover on said cover ring.

* * * * *